United States Patent
Sykes et al.

(10) Patent No.: US 8,898,063 B1
(45) Date of Patent: Nov. 25, 2014

(54) METHOD FOR CONVERTING SPEECH TO TEXT, PERFORMING NATURAL LANGUAGE PROCESSING ON THE TEXT OUTPUT, EXTRACTING DATA VALUES AND MATCHING TO AN ELECTRONIC TICKET FORM

(71) Applicant: Mark Sykes, New York, NY (US)

(72) Inventors: Mark Sykes, New York, NY (US); George Ronald Baldock, Brentwood (GB)

(73) Assignee: Mark Sykes, New York, NY (US)

( * ) Notice: Subject to any disclaimer, the term of this patent is extended or adjusted under 35 U.S.C. 154(b) by 0 days.

(21) Appl. No.: 14/215,532

(22) Filed: Mar. 17, 2014

Related U.S. Application Data

(60) Provisional application No. 61/788,021, filed on Mar. 15, 2013.

(51) Int. Cl.
| | | |
|---|---|---|
| *G10L 15/22* | (2006.01) | |
| *G06Q 40/04* | (2012.01) | |
| *G10L 17/00* | (2013.01) | |
| *G10L 15/26* | (2006.01) | |

(52) U.S. Cl.
CPC ............... *G06Q 40/04* (2013.01); *G10L 17/00* (2013.01); *G10L 15/26* (2013.01); *G10L 15/22* (2013.01)
USPC .......................................... 704/270; 704/275

(58) Field of Classification Search
CPC .......... G10L 15/18; G10L 15/22; G10L 17/00
USPC ................................................... 704/270, 275
See application file for complete search history.

(56) References Cited

U.S. PATENT DOCUMENTS

| | | | | |
|---|---|---|---|---|
| 6,507,643 B1* | 1/2003 | Groner | | 379/88.14 |
| 6,510,414 B1* | 1/2003 | Chaves | | 704/270 |
| 6,915,262 B2* | 7/2005 | Reding et al. | | 704/275 |
| 7,110,952 B2* | 9/2006 | Kursh | | 704/270.1 |
| 7,698,131 B2* | 4/2010 | Bennett | | 704/215 |
| 7,953,597 B2* | 5/2011 | Ativanichayaphong et al. | | 704/235 |
| 8,560,321 B1* | 10/2013 | Yeracaris et al. | | 704/270.1 |
| 2003/0033146 A1* | 2/2003 | Morin et al. | | 704/251 |
| 2003/0078865 A1* | 4/2003 | Lee | | 705/35 |
| 2007/0255564 A1* | 11/2007 | Yee et al. | | 704/246 |
| 2008/0162211 A1* | 7/2008 | Addington | | 705/7 |
| 2010/0286490 A1* | 11/2010 | Koverzin | | 600/301 |
| 2011/0261807 A1* | 10/2011 | Walters et al. | | 370/352 |

* cited by examiner

*Primary Examiner* — Jialong He
(74) *Attorney, Agent, or Firm* — Im IP Law PLLC; C. Andrew Im

(57) ABSTRACT

A system and method for extracting data values from a conversation to complete an electronic trade ticket over a communications network. The system comprises a plurality of client devices and a processor based server. A digital switchboard routes an incoming call from a first user to a second user to the server over the communications network. The telephone numbers of the users are verified against the stored telephone numbers in a database. A sample representing a predetermined period of the recorded conversation are utilized to identify the users. The conversation between the users are transcribed onto an electronic text file and processed to extract terms to populate data fields of an electronic trade ticket.

20 Claims, 10 Drawing Sheets

METHOD FOR CONVERTING SPEECH TO TEXT, PERFORMING NATURAL LANGUAGE PROCESSING ON THE TEXT OUTPUT, EXTRACTING DATA VALUES AND MATCHING TO AN ELECTRONIC TICKET FORM

RELATED APPLICATION

This application claims the benefit of U.S. Provisional Application No. 61/788,021 filed Mar. 15, 2013, which is incorporated herein by reference in its entirety.

FIELD OF INVENTION

The present invention relates to a financial trading system and method, and more particularly to a system and method for transcribing vocal conversations into text, performing natural language processing on the text output, extracting key data and populating an electronic ticket form, which preferably replaces manual command inputting and processing.

SUMMARY OF THE INVENTION

An object of the claimed invention is to provide a method that identifies the individuals speaking, transcribes the speech to text, performs natural language processing and extracts key informational data that auto-populates a predetermined electronic ticket form.

In accordance with an exemplary embodiment of the claimed invention, a computer based method for extracting data values from a conversation to complete an electronic trade ticket over a communications network is provided. An incoming call from a first user to a second user is routed by a digital switchboard to a processor based server over the communications network. The telephone numbers of the first and second users are verified against the stored telephone numbers in a database by a server processor. A conversation between the first and second users is recorded by a recorder of the server and the recorded conversation is stored in the database. A sample representing a predetermined period of the conversation is obtained by a speaker engine of the server to identify and verify the first and second users. The conversation is transcribed to an electronic text file by a speech recognition engine of the server and the electronic text file is stored in the database. Natural language processing on the electronic text file is performed by a natural language processing engine of the server to correct typographical, syntax and form errors, and to obtain trade information through relational co-reference and entity tracking. An electronic trade ticket is generated by extracting terms from the electronic text file to populate data fields of the electronic trade ticket by a ticket generator of the server.

In accordance with an exemplary embodiment of the claimed invention, the aforesaid method further comprises converting the electronic ticket to financial information exchange (FIX) format by a FIX engine of the server.

In accordance with an exemplary embodiment of the claimed invention, the aforesaid method further comprises splitting the electronic text file by tokens representing letters, numbers, punctuations and symbols.

In accordance with an exemplary embodiment of the claimed invention, the aforesaid method further comprises accessing the server over the communications network by a client device associated with each user.

In accordance with an exemplary embodiment of the claimed invention, the aforesaid method further comprises recording the conversation at a request of each client device such that two recordings of the conversation and two transcribed electronic text files of the conversation are stored in the database.

In accordance with an exemplary embodiment of the claimed invention, the aforesaid method further comprises comparing the two transcribed electronic text files of the conversation by an annotation differential tool of the server to determine inconsistencies between the two transcribed text files.

In accordance with an exemplary embodiment of the claimed invention, the aforesaid method further comprises determining whether all the terms for the electronic trade ticket are extracted from the electronic text file by the ticket generator. An alert message is transmitted to a client device associated with at least one of the first and second users of any missing terms by the server processor.

In accordance with an exemplary embodiment of the claimed invention, a system for extracting data values from a conversation to complete an electronic trade ticket over a communications network is provided. The system comprises a processor based server, a database and a plurality of client devices. Each client device is associated with a user and connected to the communications network. The server comprises a server processor, an application engine, and a digital switchboard for routing an incoming call from a first user to a second user to the server over the communications network. The server processor verifies the telephone numbers of the first and second users against the stored telephone numbers in the database. The application engine comprises a speaker recognition engine, a recorder, a speech recognition engine, a natural language processing engine, and a ticket generator. A conversation between the first and second users is recorded by the recorder and stored in a database. The speaker engine obtains a sample representing a predetermined period of the conversation to identify and verify the first and second users. The speech recognition engine transcribes the conversation to an electronic text file and stores the electronic text file in the database. The natural language processing engine performs natural language processing on the electronic text file to correct typographical, syntax and form errors, and to obtain trade information through relational co-reference and entity tracking. The ticket generator for generating an electronic trade ticket by extracting terms from the electronic text file to populate data fields of the electronic trade ticket.

In accordance with an exemplary embodiment of the claimed invention, the aforesaid system further comprises a FIX engine for converting the electronic ticket to financial information exchange (FIX) format.

In accordance with an exemplary embodiment of the claimed invention, the aforesaid natural language processing engine splits the electronic text file by tokens representing letters, numbers, punctuations and symbols.

In accordance with an exemplary embodiment of the claimed invention, the aforesaid client device associated with each of the first and second users accesses the server over the communications network.

In accordance with an exemplary embodiment of the claimed invention, the conversation is recorded by at least two aforesaid recorders at the request of each client device such that two recordings of the conversation and two transcribed electronic text files of the conversation are stored in the database.

In accordance with an exemplary embodiment of the claimed invention, the aforesaid server further comprises an annotation differential tool for comparing the two transcribed electronic text files of the conversation to determine inconsistencies between the two transcribed text files.

In accordance with an exemplary embodiment of the claimed invention, the aforesaid ticket generator determines whether all the terms for the electronic trade ticket are extracted from the electronic text file; and wherein the server processor transmits an alert message to a client device associated with the broker of any missing terms.

In accordance with an exemplary embodiment of the claimed invention, a non-transitory computer readable medium comprises computer executable code for extracting data values from a conversation to complete an electronic trade ticket over a communications network. The computer executable comprising instructions for routing an incoming call from a first user to a second user by a digital switchboard to a processor based server over the communications network. The telephone numbers of the first and second users are verified against the stored telephone numbers in a database by a server processor. A conversation between the first and second users is recorded by a recorder of the server and the conversation is stored in the database. A sample representing a predetermined period of the conversation is obtained by a speaker engine of the server to identify and verify the first and second users. The conversation is transcribed onto an electronic text file by a speech recognition engine of the server and storing the electronic text file in the database. Natural language processing is performed on the electronic text file by a natural language processing engine of the server to correct typographical, syntax and form errors, and to obtain trade information through relational co-reference and entity tracking. An electronic trade ticket is generated by extracting terms from the electronic text file to populate data fields of the electronic trade ticket by a ticket generator of the server.

In accordance with an exemplary embodiment of the claimed invention, the aforesaid computer executable code further comprises instructions for converting the electronic ticket to financial information exchange (FIX) format by a FIX engine of the server.

In accordance with an exemplary embodiment of the claimed invention, the aforesaid computer executable code further comprises instructions for splitting the electronic text file by tokens representing letters, numbers, punctuations and symbols.

In accordance with an exemplary embodiment of the claimed invention, the aforesaid computer executable code further comprises instructions for recording the conversation at a request of each client device such that two recordings of the conversation and two transcribed electronic text files of the conversation are stored in the database.

In accordance with an exemplary embodiment of the claimed invention, the aforesaid computer executable code further comprises instructions for comparing the two transcribed electronic text files of the conversation by an annotation differential tool of the server to determine inconsistencies between the two transcribed text files.

In accordance with an exemplary embodiment of the claimed invention, the aforesaid computer executable code further comprises instructions for determining whether all the terms for the electronic trade ticket are extracted from the electronic text file by the ticket generator. An alert message is transmitted to a client device associated with a broker of any missing terms by the server processor.

Various other objects, advantages, and features of the claimed invention will become readily apparent from the ensuing detailed description, and the novel features will be particularly pointed out in the appended claims

BRIEF DESCRIPTION OF THE DRAWINGS

The following detailed description, given by way of example, and not intended to limit the claimed invention solely thereto, will best be understood in conjunction with the accompanying drawings in which:

DETAILED DESCRIPTION OF THE EMBODIMENTS

The term "client device" or "user device" represents an information processor or device, such as personal digital assistant, tablet, laptop, PC, work station, net book, mobile or smart phone, wireless device and other comparable web-enabled or communications-enabled device. The claimed invention is readily implemented by presently available communications apparatus and electronic components. The invention find ready application in virtually all commercial communications networks, including, but not limited to an intranet, a local area network (LAN), a wide area network (WAN), world wide web, a telephone network, a wireless network, and a wired cable transmission system. The client device can access these communications network using BLUETOOTH®, WI-FED and any other comparable means. BLUETOOTH is a registered trademark of Bluetooth SIG, Inc. and WI-FI is a registered trademark of Wi-Fi Alliance Corporation.

Figure 1:
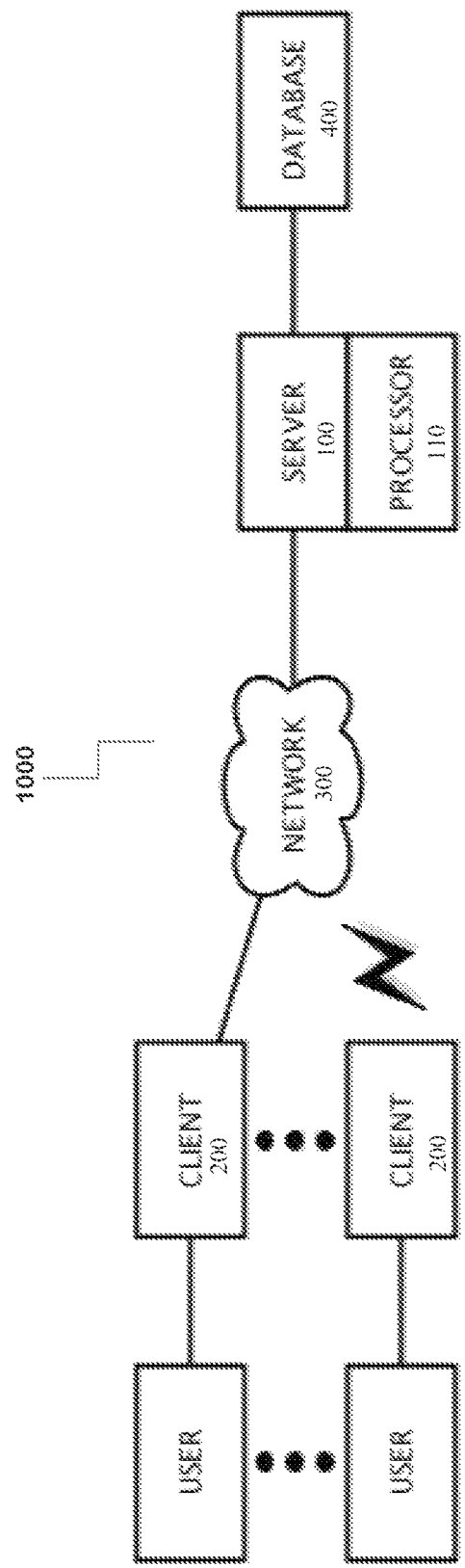
FIG. 1 is a schematic diagram of the client-server system in accordance with an exemplary embodiment of the claimed invention.

FIG. 1 shows a client-server system architecture in accordance with an exemplary embodiment of the claimed invention. The client-server system 1000 comprises server side operations working on one or more central server(s) 100, while linking to multiple client side processes working on separate client device(s) 200. The client devices 200 are linked via a specified network 300, as exemplary shown in FIG. 1.

A user is a trader or broker who engages in financial activity/transactions. An application as used herein is a computer program accessed via the specified network 300 using a client device 200 by the user. A client or client device 200 is a desktop computer, a laptop, a net book, a tablet, a work station, and/or a network-enabled processor based device or mobile device, such as a smart phone, that is connected to the network 300. The network 300 is a collection of computers, terminals and other hardware connected by communication channels allowing for the sharing of information. A server 100 executes or runs one or more active processes that respond and reply to client side requests from the client device 200. A processor 110, 210 is a device capable of executing one or more programs on the server 100 and client device 200, respectively. A database 400 stores a large amount of organized data that is used for search and retrieval.

The user uses a processor based client device 200 (which can be a smart phone, personal computer (PC), laptop, net book, tablet, a network-enabled electronic device, such as a personal digital assistant (PDA) and the like) to access the application/program running on the processor based server 100 over a communications network 300. It is appreciated that the communications network can be public or private network.

In accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location, e.g. the server 100 or another web server (not shown).

Figure 2A:
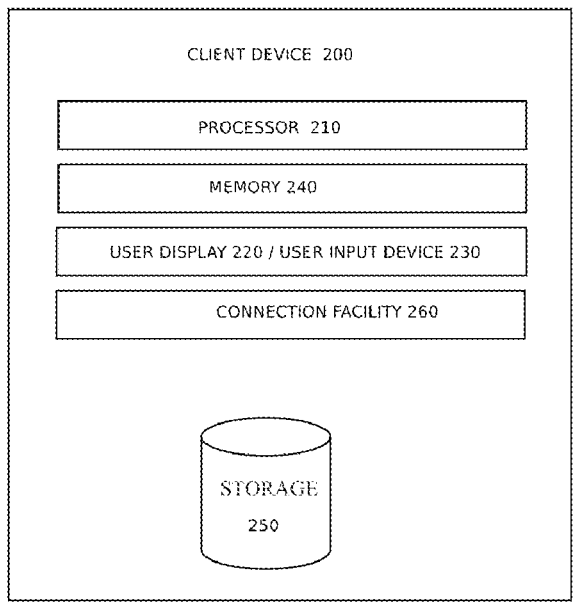
FIG. 2A is a block diagram of a client device in accordance with an exemplary embodiment of the claimed invention.
Figure 2B:
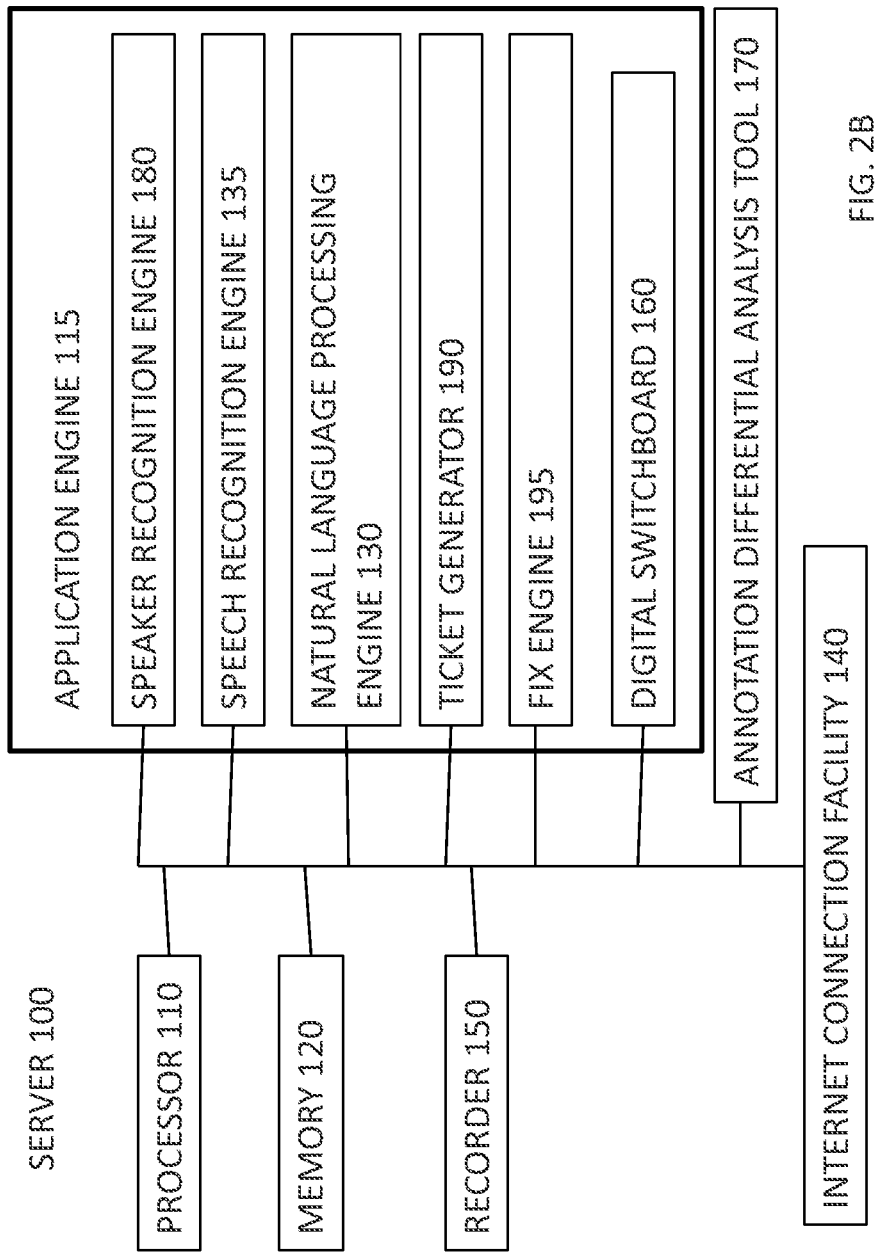
FIG. 2B is a block diagram of a server in accordance with an exemplary embodiment of the claimed invention.

As shown in FIG. 1, at the system level, the claimed invention comprises one or more web-enabled processor based client devices 200, one or more processor based servers 100, one or more databases 400, and a communications network 300. Each client device 200 is associated with a user. In accordance with an exemplary embodiment of the claimed invention, as shown in FIG. 2A, each client device 200 comprises a processor or client processor 210, a display or screen 220, an input device 230 (which can be the same as the display 220 in the case of touch screens), a memory 240, a storage device 250 (preferably, a persistent storage, e.g., hard drive), and a connection facility 260 to connect to the communications network 300.

In accordance with an exemplary embodiment of the claimed invention, the server 100 comprise a processor or server processor 110, a memory 120, and a connection facility 140 to connect to the communications network 300.

The network enabled client device 200 includes but is not limited to a computer system, a personal computer, a laptop, a notebook, a netbook, a tablet or tablet like device, an IPad® (IPAD is a registered trademark of Apple Inc.) or IPad like device, a cell phone, a smart phone, a personal digital assistant (PDA), a mobile device, or a television, or any such device having a screen connected to the communications network 300 and the like.

The communications network 300 can be any type of electronic transmission medium, for example, including but not limited to the following networks: a telecommunications network, a wireless network, a virtual private network, a public internet, a private internet, a secure internet, a private network, a public network, a value-added network, an intranet, a wireless gateway, or the like. In addition, the connectivity to the communications network 300 may be via, for example, by cellular transmission, Ethernet, Token Ring, Fiber Distributed Datalink Interface, Asynchronous Transfer Mode, Wireless Application Protocol, or any other form of network connectivity.

Moreover, in accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location, e.g. the server 100 or another web server (not shown).

In accordance with an exemplary embodiment of the claimed invention, the inventive system and method for converting speech to text, analyzing text, extracting requisite data to populate an electronic document or ticket is now described herein from the perspective of two users or speakers regarding a securities transaction, e.g., buying or selling shares of common stock of publicly traded company. In accordance with an exemplary embodiment of the claimed invention, the server 100, specifically the server processor 110, authenticates each user before providing access to the server 100.

In accordance with an exemplary embodiment of the claimed invention, the server processor 110 extracts various terms needed from the voice conversation or the electronic text file containing the transcribed voice conversation between two users or speakers, e.g., a conversation between a broker and a client regarding a securities transaction, to complete an electronic ticket form. In accordance with an exemplary embodiment of the claimed invention, the server processor 110 extracts the following data terms from the electronic text file: date and time; company name(s); name of speakers(s); action; volume; month(s); contract type; and price. For example, the conversation is between broker and a client regarding a purchase of 1000 shares of IBM's common stock at market price.

In accordance with an exemplary embodiment of the claimed invention, the server 100 comprises a speaker recognition engine 180 for identifying and verifying the users or speakers in phase 1; a speech recognition engine 135 for transcribing speech to text in phase 2; a natural language processing engine 130 for natural language processing of the text output in phase 3; a ticket generator 190 extracting terms from the text output to complete an electronic trade ticket in phase 4; and a financial information exchange (FIX) engine 195 for converting the electronic trade ticket to a FIX message format in phase 5. These five engines are collectively referred to herein as the application engine 115. Preferably, the server processor 110 executes/runs the speaker recognition engine 180 and the speech recognition 135 in parallel with each other to simultaneously identify the speakers/users and transcribe their conversation.

Speaker Recognition Engine 180: Identification & Verification (Runs in Parallel with the Speech Recognition Engine 135 in Phase 2)

Receives incoming call from Speaker A to Speaker B

Re-routes the incoming call via the digital switchboard 160. The telephone number(s) are matched against the telephone numbers stored in the database 400 and added to the electronic ticket.

After a 5 second coverage of the conversation, a match is made to the stored voice recordings in the database 400 identifying the speaker(s)

If speaker(s) are not identified they are then tagged, separated, numbered and entered into the database 400 as Unknown (number)

Speaker(s) voices are identified, verified and matched to the electronic text file Speech Recognition Engine 135: Transcribe Speech to Text (Runs in Parallel with the Speaker Recognition Engine 130 in Phase 1)
  Speaker(s) begin their conversation
  The conversation is transcribed onto an electronic text file
  Speech to text is split into tokens (numbers, symbols, word types etc.)
Natural Language Processing Engine 180: Natural Language Processing
  Typographical mistakes, syntax errors and form errors are corrected
  Trade information through relational co-reference, entity tracking and identity relations between entities are recognized
  An annotation differential tool 170 to compare the speech to text transcription of Speaker A against the speech to text transcription of Speaker B and highlight any inconsistencies
Ticket Generator 190: Electronic Ticket Extraction
  Trade information identified in the Text Analysis is extracted from the transcription text file and auto-populates a standard electronic ticket form with pre-set data fields
  Generates a new instance in the knowledge base
  Completed electronic ticket forms will be sent directly to the speaker(s) screen awaiting confirmation
  Partial error tickets (missing data values, format etc.) will be flagged and sent directly to primary holding awaiting further instructions
  If no co-references or entities are recognized then the text file will be flagged and sent to secondary holding awaiting further instructions (in the case of a non-trade conversation/call)
FIX Engine 195: FIX Messaging Format Conversion
  Conversion of the electronic text file to a standardized financial communication protocol ready for data exchange through a pre-defined network
  Allows for real-time message exchange with the server processor and third party Order Books/Order Matching Engines In Phase 1, for example, the speaker A (e.g., broker) receives an incoming call from the speaker B (e.g., client) regarding a securities transaction. In accordance with an exemplary embodiment of the claimed invention, the server processor 110 re-routes the call via the digital switchboard 160 and the speaker recognition engine 180 identifies both speakers and the telephone line(s). As exemplary shown in FIG. 3, the digital switchboard 160 re-routes all calls through the 2-channel system at step 310, which enables the speaker recognition engine 180 to accurately identify the speaker(s) on the telephone line.

Figure 3:
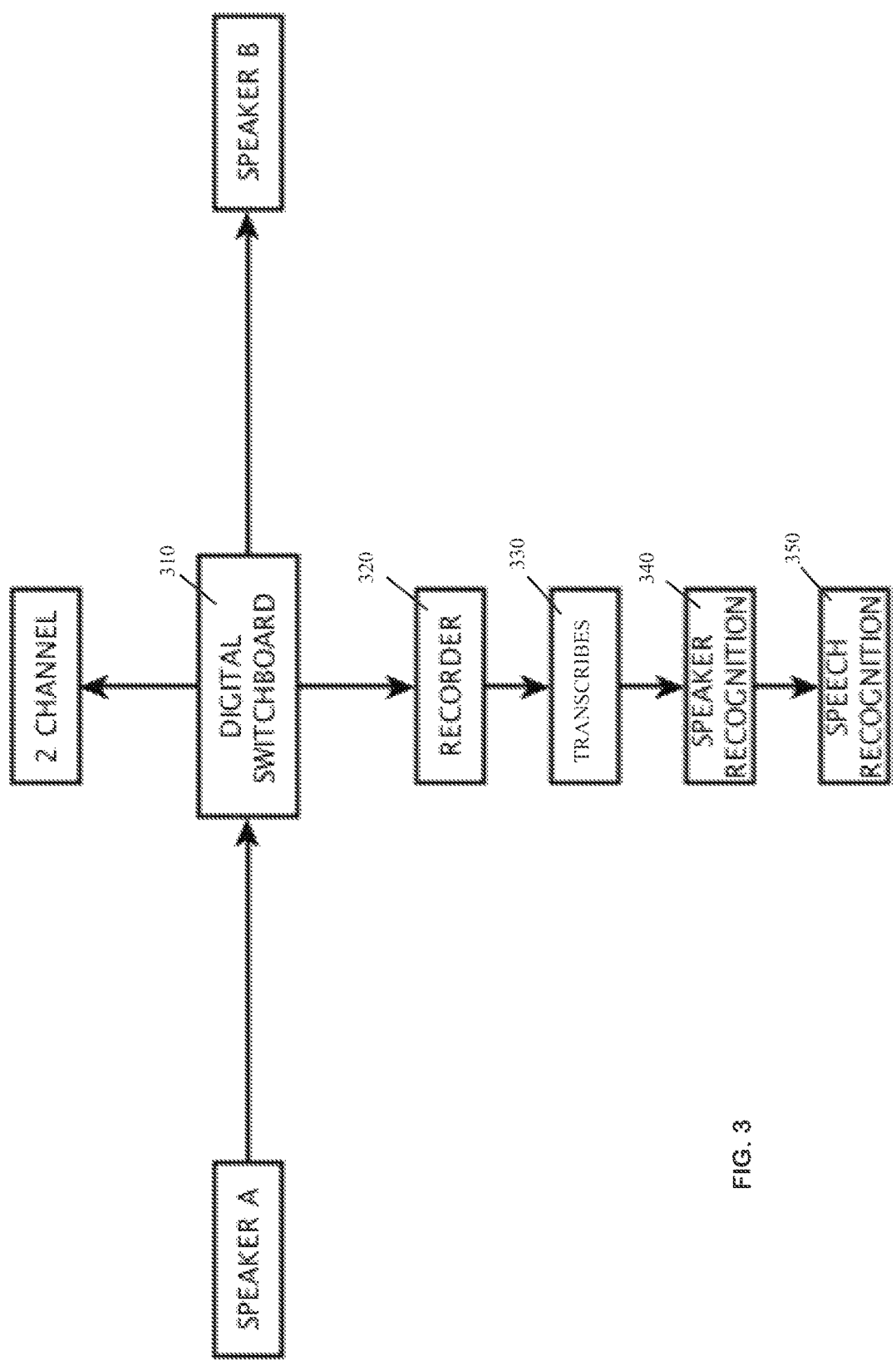
FIG. 3 is a schematic diagram of the digital switchboard connectivity in accordance with exemplary embodiment of the claimed invention.
Figure 4:
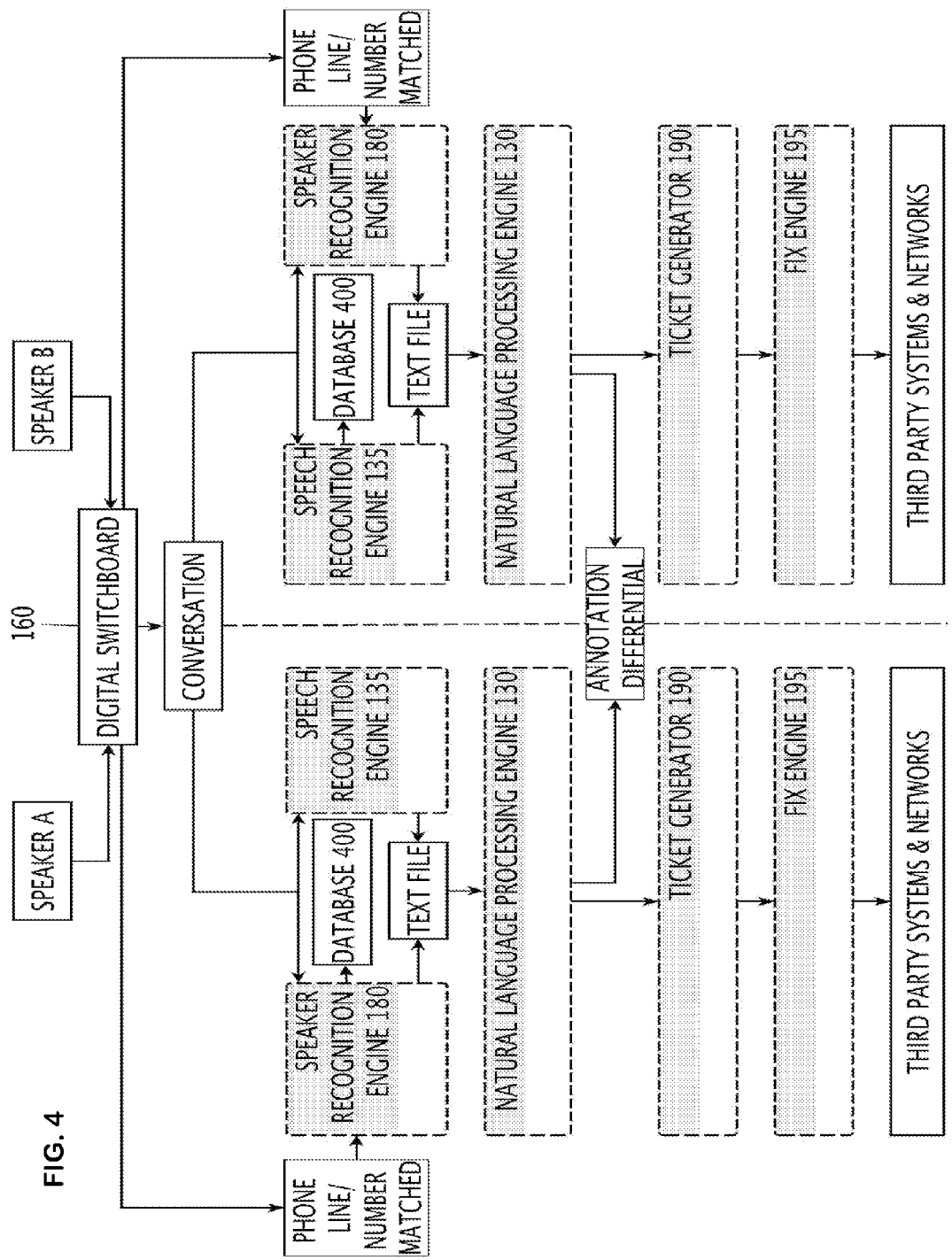
FIGS. 4 and 4A-4D are flow diagrams of capturing the conversation between two speakers, e.g., a broker and a client, in accordance with an exemplary embodiment of the claimed invention.

The speaker recognition engine 180 of the server 100 authenticates each user before providing access to the server 100, as exemplary shown in FIGS. 3 and 4. The speaker recognition engine 180 matches the telephone number(s) of the speaker(s), e.g., caller-id information, against the telephone numbers stored in the database 400. The recorder 150 of the server processor 110 records the conversation in the database 400 and the speaker recognition engine 180 takes a predetermined period of the recorded conversation, preferably a five-second sample or coverage of the conversation at step 320. The speech recognition engine 135 transcribes the recorded conversation or converts the recorded conversation to electronic text file at step 330. The speaker recognition engine 180 identifies the speakers A, B by matching the five-second sample to the stored voice recordings in the database 400 at step 340. The speaker recognition engine 180 flags the unrecognized voices for further instruction and/or processing, such as storing newly identified voice(s) into the database 400. Once the speaker recognition engine 180 identifies the telephone lines and the voices of both speakers, the identified voices are verified and matched to a stored electronic text file. Thereafter, the speech recognition engine 135 transcribes the conversation onto the electronic text file at step 350.

In accordance with an exemplary embodiment of the claimed invention, the user accesses server 100 and the application engine 115 running on the server 100 by way of a web browser running on the client device 200 associated with the user or via a trading platform. Upon initiating the application engine 115, the server processor 100 presents the user on the user display 220 of the client device 200 with two options: Sign up and Login. If the user is a first time user she must sign up or register as an authorized user to access and use the application engine 115 running on the server 100. In accordance with an exemplary embodiment of the claimed invention, the sign up process can consist of the new user reading aloud into the user input device 230, e.g., microphone, the terms and conditions of accessing and using the application engine 115. The terms and conditions are displayed on the screen 220 of the client device 200. Alternatively, a separate telephone connection is established with the service provider operating or managing the server 100 for the user to read aloud the terms and conditions into the telephone headset (not shown). The sign up process for the new user is referred to herein as the voice enrollment and allows the server 100 to obtain, record and store a predetermined period of recording or coverage of the user's voice, preferably 60 second voice coverage, in the database 400 for future voice matches. After reading the terms and conditions of the application engine 115, in accordance with an exemplary embodiment of the claimed invention, the new user manually types her full name into a text box displayed underneath the terms and conditions on the screen 220 of the client device. Essentially, the new user is agreeing to the terms and conditions for accessing and using the application engine 115 running on the server 100 as well providing the server with the correct name to accurately match with the voice enrollment.

Whereas, if the user is already an authorized user, then the server processor 110 skips the sign up process and initiates the login process to enable the user to access and use the application engine 115 running on the server 100. In accordance with an exemplary embodiment of the claimed invention, the server processor 110 initiates the login process by prompting the user to provide a predetermined period of voice coverage, preferably 5 second voice coverage. As exemplary shown in FIGS. 4, 4A, 4C, the speaker recognition engine 180 matches the voice coverage sample against the voice recordings stored in the database 400 to verify the user's identity in phase 1. When the speaker recognition engine 180 has verified the user's identity through the voice comparison process, the server processor 110 opens the application engine 115 to be accessed by the client device 200 and used by the user associated with the client device 200.

In accordance with an exemplary embodiment of the claimed invention, the application engine 115, specifically the ticket generator 190, extracts the terms or key terms from the recorded conversation for populating an electronic trade ticket, e.g., to purchase or sell publicly traded securities. The terms to be extracted for the electronic trade ticket is typically established by a governmental entity or by organization operating the financial exchanges. The extract terms can include but is not limited to ticker symbol, price, volume, contract type, etc. It is appreciated that the user may pre-define any key term that is present in the transcribed and analyzed speech.

In phase 2, when the user makes a call to or receives a call, the recorder 150, preferably the built-in recorder of the application engine 115, records the entirety of the conversation. The recorder 150 associated with each application engine 115 and each user (Speaker A and Speaker B) independently records the conversation between the speaker A and the speaker B. As exemplary shown in FIGS. 4, 4A, 4C, the speech recognition engine 135 associated with each user/speaker transcribes the conversation between the speaker A and the speaker B and generates text, preferably independent electronic text file of the conversation. The server processor 110 stores two electronic text files generated by the speech recognition engine 135 associated with each user/speaker in the database 400. During the recording of the conversation by the speech recognition engine 135 in phase 2, the speaker recognition engine 180 simultaneously identifies each user/speaker in phase 1.

Figure 4A:
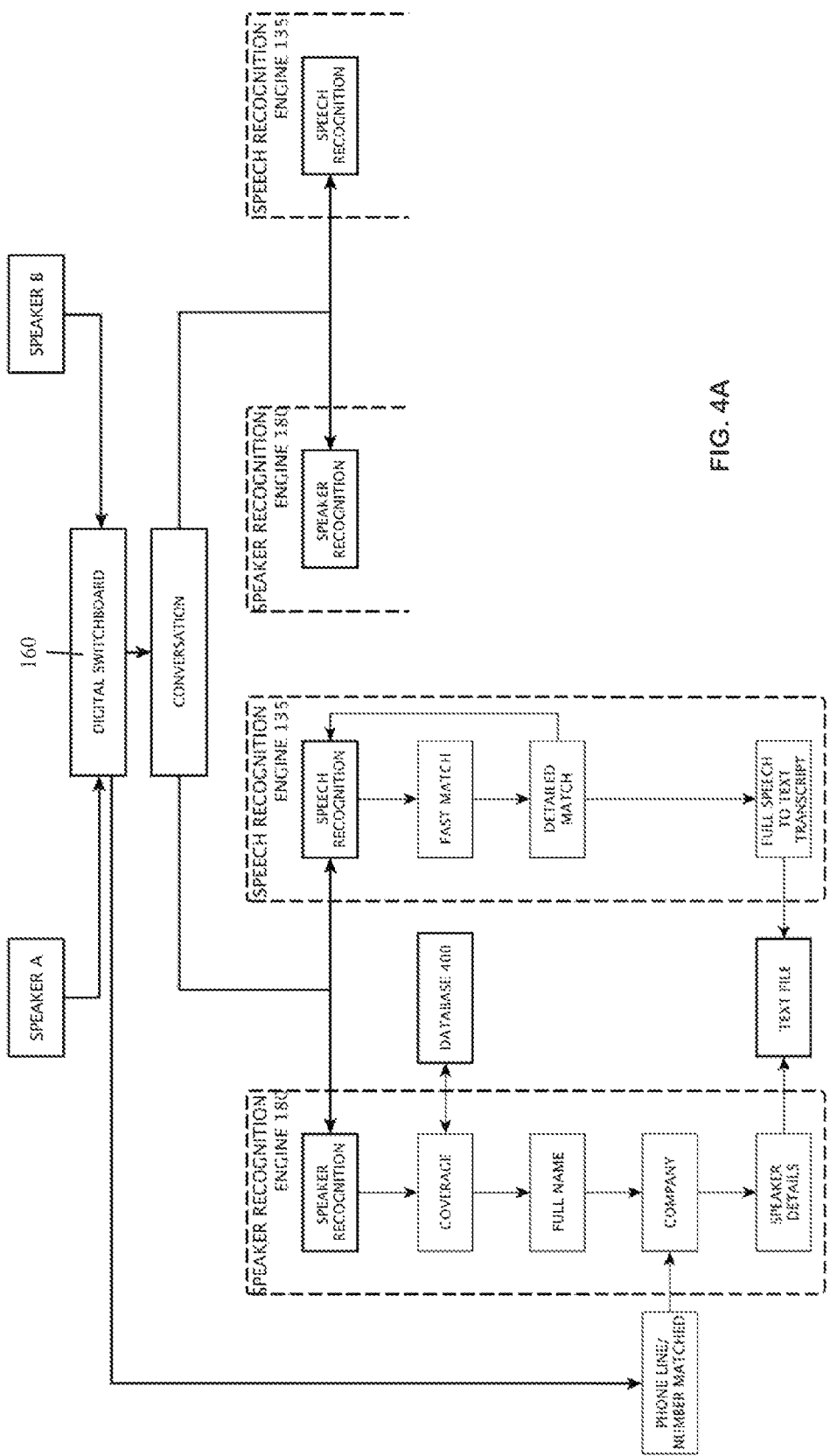
Figure 4B:
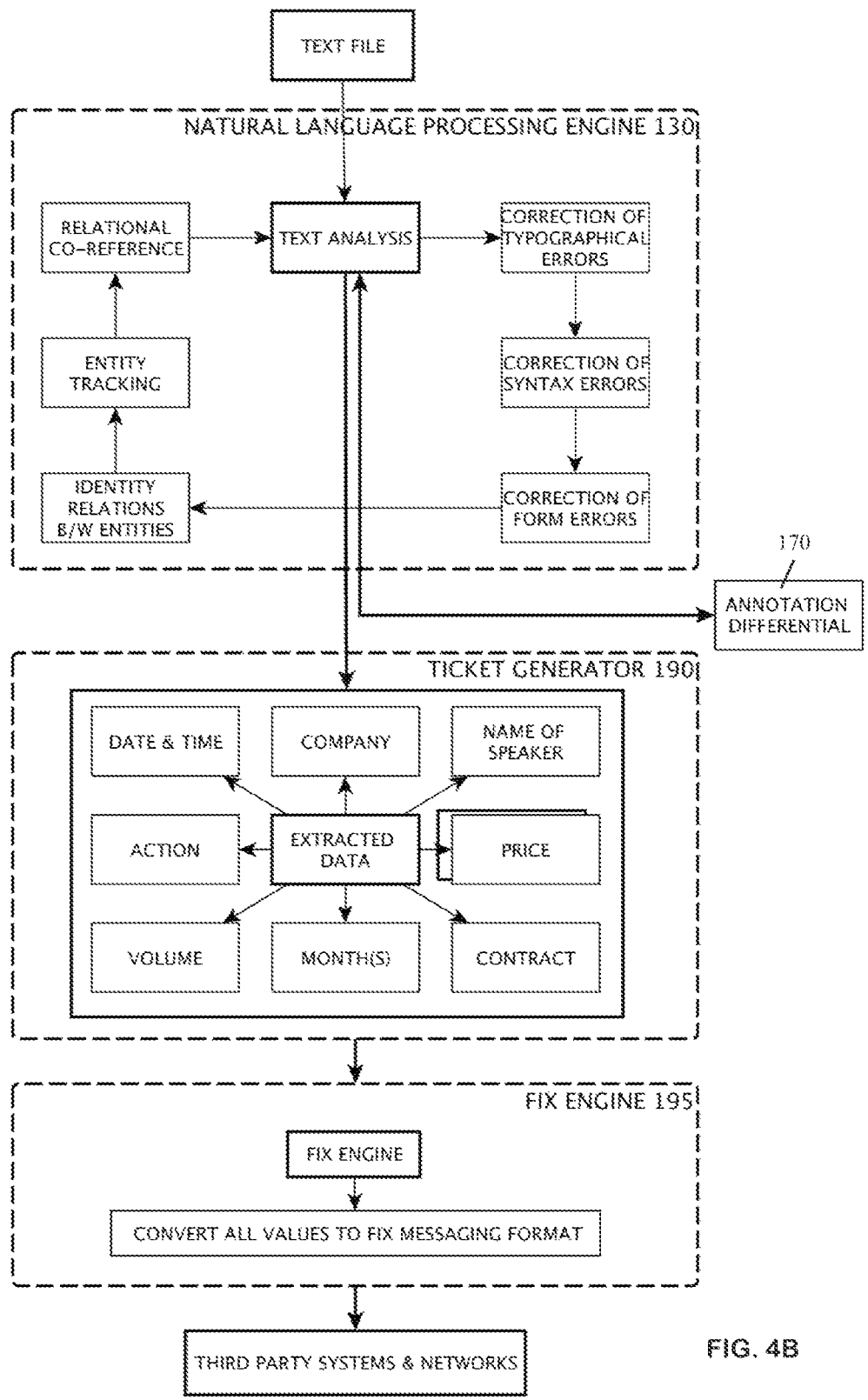
Figure 4C:
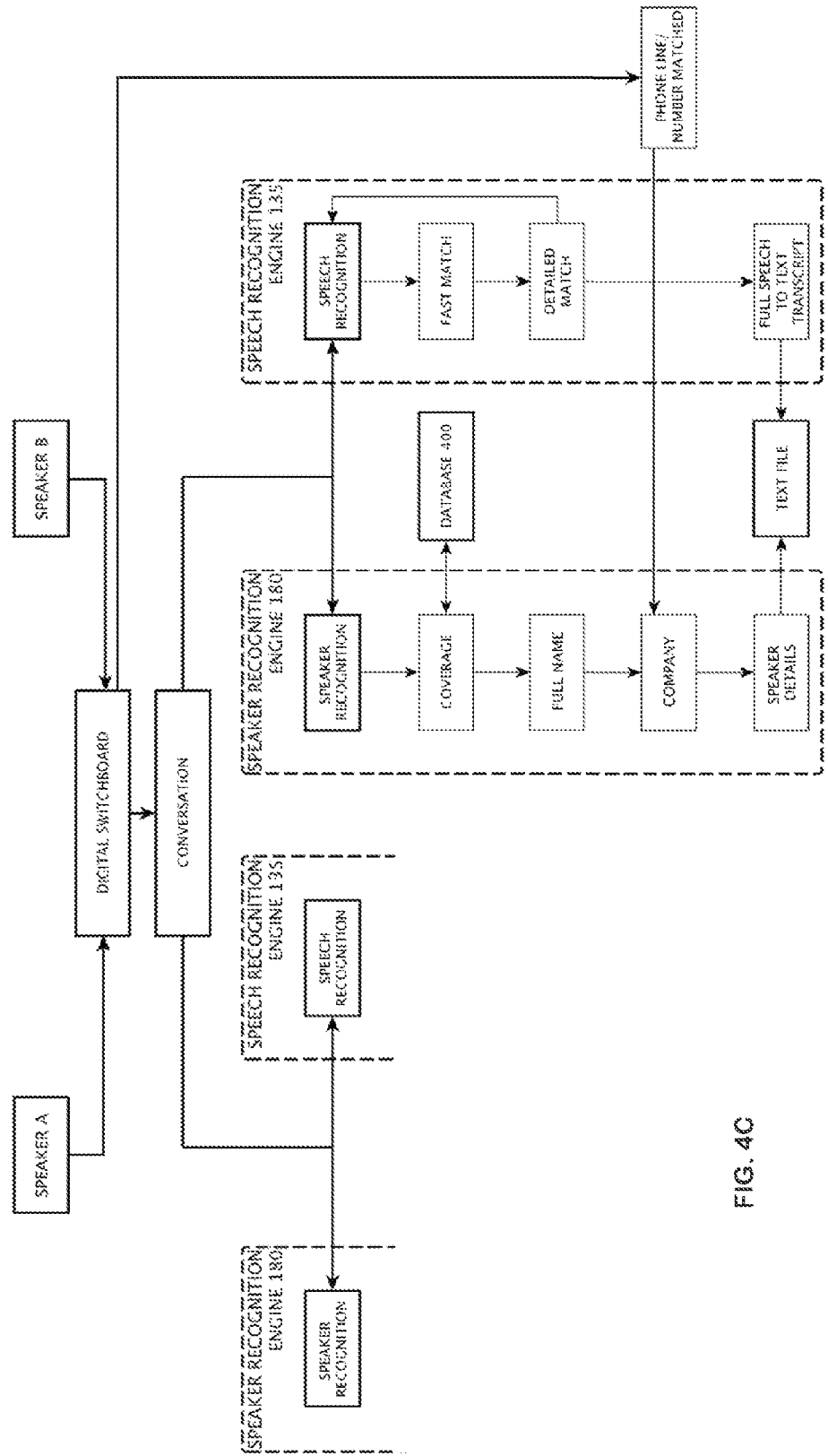

In accordance with an exemplary embodiment of the claimed invention, as shown in FIGS. 4, 4A, 4C in phase 1, the speaker recognition engine 180 takes a predetermined minimum coverage of the conversation, e.g., a minimum of five-second coverage of the conversation and matches against the voice recordings in the database 400 to identify each speaker or user identification. Unrecognized voices are flagged by the server processor 110 awaiting further user instruction at the end of phase 4. Once the identification of the speaker(s) is completed, the speaker recognition engine 180 compares and matches the user identifications to the electronic text file stored in the database 400. As soon as the recorder 150 begins recording, in accordance with an exemplary embodiment of the claimed invention, the speech recognition engine 135 concurrently transcribes the conversation that takes place between Speaker A and Speaker B in phase 1. That is, the server processor 110 concurrently executes/runs the speaker recognition engine 180 and the speech recognition engine 135 to simultaneously initiate phases 1 and 2. The speech recognition engine 135 stores the transcribed conversation in the database 400. Alternatively, the speech recognition engine 135 can transcribe the conversation after a predetermined period of time into the conversation or upon completion of the conversation.

In accordance with an exemplary embodiment of the claimed invention, as exemplary shown in FIGS. 4, 4A, 4C, the speech recognition engine 135 performs a Fast Match that quickly matches the transcribed conversation against a condensed vocabulary stored in the database 400 and performs a Detailed Match that more carefully matches the transcribed conversation against a much broader vocabulary stored in the database 400. That is, the speech recognition engine 135 performs the Fast Match by utilizing only a subset of the vocabulary used in performing the Detailed Match. Preferably, the speech recognition engine 135 transcribes both sides of the conversation to accurately verify what was spoken between the two speakers A, B.

Turning now to FIG. 4, there is shown an overall flow diagram for both speakers/users A, B in the conversation. The claim system 1000 can either work as an one-user sub-system or as a complete two-user system. In accordance with an exemplary embodiment of the claimed invention, the application engine 115 can be configured to run either as a stand-alone module or integrated into a larger trading system.

Figure 4D:
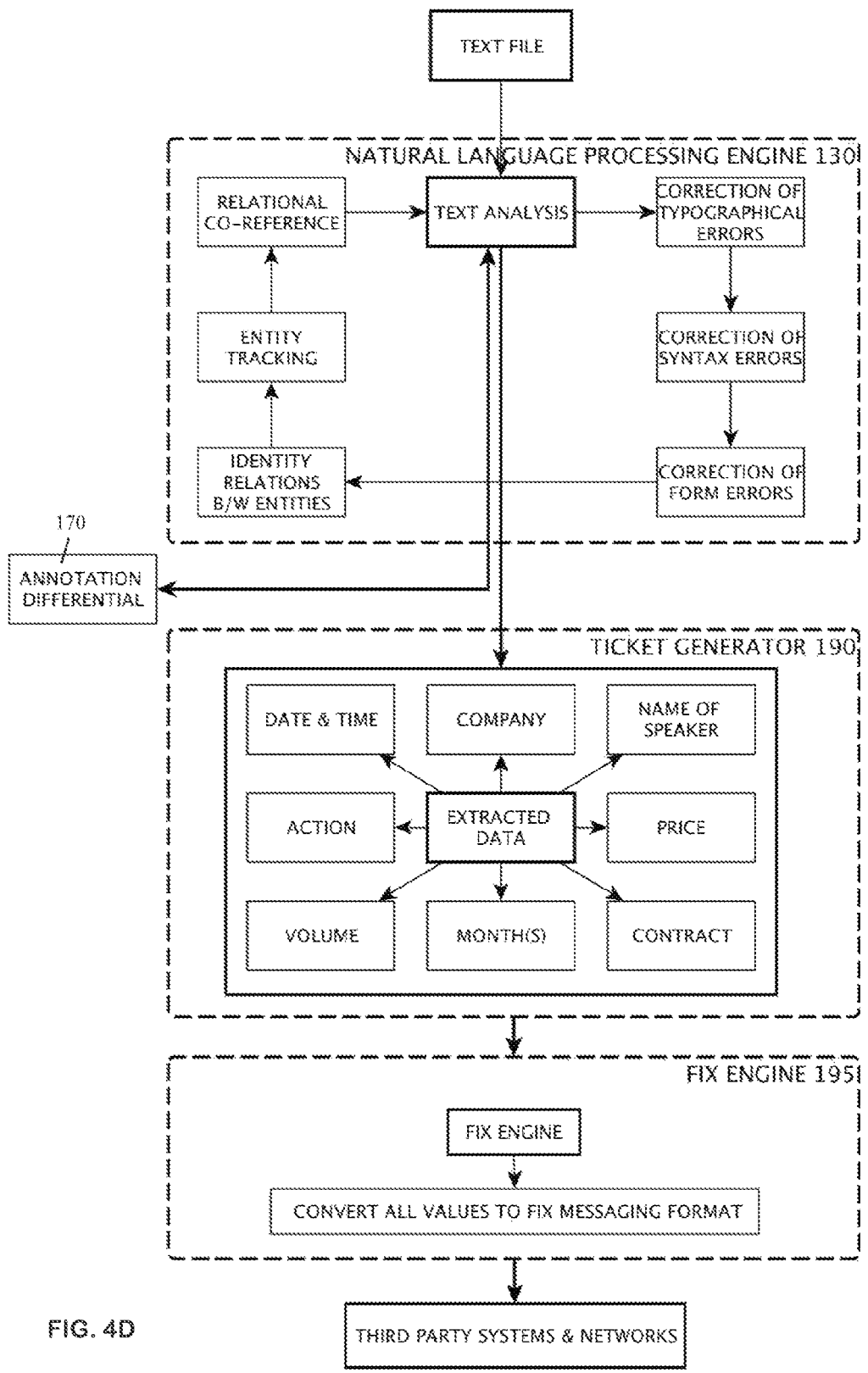

In accordance with an exemplary embodiment of the claimed invention, as exemplary shown in FIGS. 4, 4B, 4D, the natural language processing engine 130 performs natural language processing by analyzing the electronic text file in at least two ways in phase 3. Firstly, the natural language processing engine 130 corrects typographical, syntax and form errors. Secondly, the natural language processing engine 130 identifies entities, relations between entities and performs relational co-reference. It is appreciated that the amount of entities to be tracked by the application engine 115 can be customized based on the need of the user.

In accordance with an exemplary embodiment of the invention, if only Speaker A (e.g., the broker) is utilizing the application engine 115, the natural language processing engine 130 still transcribes the conversation between both speakers, but the server processor 110 will not be able to use the annotation differential analysis tool 170 to compare the transcripts or transcribed conversations by the two speech recognition engines 135, each being associated with one of the two speakers/users. The natural language processing engine 130 stores the finalized transcription to an electronic text file in the database 400. After the conversation ends and the recorder 150 stops recording, in accordance with an exemplary embodiment of the claimed invention, the natural language processing engine 130 analyzes the stored electronic text file.

Figure 5:
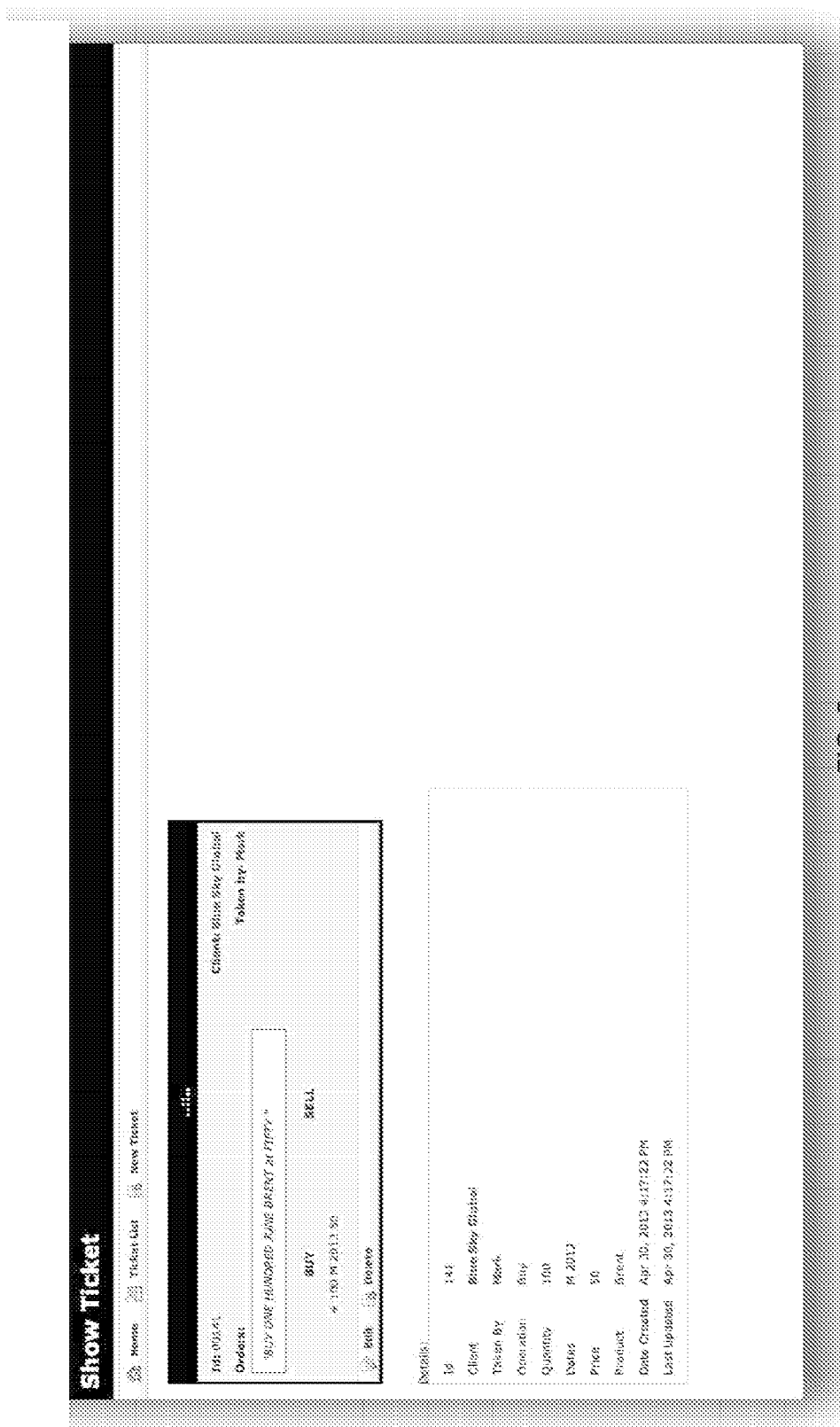
FIG. 5 is a screenshot of an exemplary electronic trade ticket.

In accordance with an exemplary embodiment of the claimed invention, if both users/speakers A, B are using the application engine 115, the server processor 110 utilizes the annotation differential tool 170 to compare the speech to text transcription of Speaker A against the speech to text transcription of Speaker B. The annotation differential tool 170 highlights any inconsistencies between the two transcriptions. Once the analysis has been completed by the annotation differential tool 170, in accordance with an exemplary embodiment of the claimed invention, the ticket generator 190 extracts data terms, preferably key data terms, and matches the data terms the pre-set data fields on the electronic trade ticket in phase 4, such as the exemplary electronic trade ticket shown in FIG. 5. It is appreciated that the number of data fields on the electronic form can be fully customized to the need of the user. As noted herein, the data terms extracted from the conversation include but are not limited to date, time, name of speaker(s), name of the company, trade action (e.g. buy or sell), volume, month(s), contract type and price. If any data terms are missing from the electronic trade ticket (e.g., company name and price), then the ticket generator 190 prompts the user to manually input the missing information via a primary holding. The server processor 110 flags non-broker conversations (e.g., personal calls that contain no key data terms) and sends the transcribed conversation to a secondary holding or storage awaiting further instructions from the broker user. When all of the data fields on the electronic ticket form have been filled, the ticket generator 190 displays the completed ticket on the screen 220 of the client device 200 associated with the broker user to be submitted or rejected by the user. In accordance with an exemplary embodiment of the claimed invention, the user manually clicks one of the two buttons (representing submit or reject) on the screen 220 using an input device 230. If the submit button is clicked by the user, then, in accordance with an exemplary embodiment of the claimed invention, the ticket generator 190 converts completed electronic ticket into a Financial Information eXchange (FIX) communication protocol ready format in phase 5 and transmits to a financial exchange through a predefined network for processing and execution.

In accordance with an exemplary embodiment of the claimed invention, the server processor 110 utilizes speech acoustic models based on two levels of speak adaption process. That is, the application engine 115, specifically the speaker recognition engine 180 and speech recognition engine 135, develops and utilizes the speech recognition acoustic model via a posteriori speaker adaption method. In this way, the more data the application engine 115 receives via speaker/user interaction, the application engine 115 can better fine tune the speech recognition model to the individual speaker/user. As a result, the acoustic model utilized by the application engine 115 is a learning system and the accuracy improves with usage and familiarity with the user/speaker. The application engine 115 develops an individual acoustic model for each user and continuously adapts the acoustic model as that individual uses the system. In accordance with an exemplary embodiment of the claimed invention, there are two levels to the system's adaption process. The first level is the preliminary level or level one and is performed/reached during the speaker enrollment stage as detailed herein. The second level is reached through extended usage of the system by the speaker, which allows the server processor 110 to fully customize the acoustic model to the specific speaker. Preferably, the server processor 110 adapts the acoustic model only when fully correct transcription results occur and discards any incomplete or wrong transcription results.

In accordance with an exemplary embodiment of the claimed invention, the server processor 110 utilizes a probabilistic language model to increase overall accuracy and intelligibility of the output, e.g., the transcribed conversation or electronic text file. That is, the server processor 110, specifically the speaker recognition engine 180 and the speech recognition engine 135, develops and utilizes the speech recognition probabilistic language model to decrease the amount of mistakes made in the output of the speech recognition process and only allows possible paths to survive in the search process.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A computer based method for extracting data values from a conversation to complete an electronic trade ticket over a communications network, comprising the steps of:
routing an incoming call from a first user to a second user by a digital switchboard to a processor based server over the communications network;
verifying telephone numbers of the first and second users against the stored telephone numbers in a database by a server processor;
recording a conversation between the first and second users by a recorder of the server and storing the conversation in the database;
obtaining a sample representing a predetermined period of the conversation by a speaker engine of the server to identify and verify the first and second users;
transcribing the conversation to an electronic text file by a speech recognition engine of the server and storing the electronic text file in the database;
performing natural language processing on the electronic text file by a natural language processing engine of the server to correct typographical, syntax and form errors, and to obtain trade information through relational co-reference and entity tracking; and
generating an electronic trade ticket by extracting terms from the electronic text file to populate data fields of the electronic trade ticket by a ticket generator of the server.

2. The method of claim 1, further comprising the step of converting the electronic ticket to financial information exchange (FIX) format by a FIX engine of the server.

3. The method of claim 1, wherein the step of performing natural language processing further comprises the step of splitting the electronic text file by tokens representing letters, numbers, punctuations and symbols.

4. The method of claim 1, further comprising the step of accessing the server over the communications network by a client device associated with each user.

5. The method of claim 4, further comprising the step recording the conversation at a request of each client device such that two recordings of the conversation and two transcribed electronic text files of the conversation are stored in the database.

6. The method of claim 5, further comprising the step of comparing the two transcribed electronic text files of the conversation by an annotation differential tool of the server to determine inconsistencies between the two transcribed text files.

7. The method of claim 1, further comprising the step of determining whether all the terms for the electronic trade ticket are extracted from the electronic text file by the ticket generator; and transmitting an alert message to a client device associated with at least one of the first and second users of any missing terms by the server processor.

8. A system for extracting data values from a conversation to complete an electronic trade ticket over a communications network, comprising:
a plurality of client devices, each associated with a user and connected to the communications network;
a processor based server comprising:
a digital switchboard for routing an incoming call from a first user to a second user to the server over the communications network;
a server processor for verifying telephone numbers of the first and second users against the stored telephone numbers in a database;
a recorder for recording a conversation between the first and second users in a database;
a speaker engine for obtaining a sample representing a predetermined period of the conversation to identify and verify the first and second users;
a speech recognition engine for transcribing the conversation to an electronic text file and storing the electronic text file in the database;
a natural language processing engine for performing natural language processing on the electronic text file to correct typographical, syntax and form errors, and to obtain trade information through relational co-reference and entity tracking; and
a ticket generator for generating an electronic trade ticket by extracting terms from the electronic text file to populate data fields of the electronic trade ticket.

9. The system of claim 8, further comprising a FIX engine for converting the electronic ticket to financial information exchange (FIX) format.

10. The system of claim 8, wherein the natural language processing engine splits the electronic text file by tokens representing letters, numbers, punctuations and symbols.

11. The system of claim 8, wherein a client device associated with each of the first and second users accesses the server over the communications network.

12. The system of claim 11, wherein at least two recorders record the conversation at a request of each client device such that two recordings of the conversation and two transcribed electronic text files of the conversation are stored in the database.

13. The system of claim 12, wherein the server further comprises an annotation differential tool for comparing the two transcribed electronic text files of the conversation to determine inconsistencies between the two transcribed text files.

14. The system of claim 8, wherein the ticket generator determines whether all the terms for the electronic trade ticket are extracted from the electronic text file; and wherein the server processor transmits an alert message to a client device associated with at least one of the first and second users of any missing terms.

15. A non-transitory computer readable medium comprising computer executable code for extracting data values from a conversation to complete an electronic trade ticket over a communications network, said computer executable comprising instructions for:
- routing an incoming call from a first user to a second user by a digital switchboard to a processor based server over the communications network;
- verifying telephone numbers of the first and second users against the stored telephone numbers in a database by a server processor;
- recording a conversation between the first and second users by a recorder of the server and storing the conversation in the database;
- obtaining a sample representing a predetermined period of the conversation by a speaker engine of the server to identify and verify the first and second users;
- transcribing the conversation to an electronic text file by a speech recognition engine of the server and storing the electronic text file in the database;
- performing natural language processing on the electronic text file by a natural language processing engine of the server to correct typographical, syntax and form errors, and to obtain trade information through relational co-reference and entity tracking; and
- generating an electronic trade ticket by extracting terms from the electronic text file to populate data fields of the electronic trade ticket by a ticket generator of the server.

16. The computer readable medium of claim 15, wherein said computer executable code further comprises instructions for converting the electronic ticket to financial information exchange (FIX) format by a FIX engine of the server.

17. The computer readable medium of claim 15, wherein said computer executable code further comprises instructions for splitting the electronic text file by tokens representing letters, numbers, punctuations and symbols.

18. The computer readable medium of claim 15, wherein said computer executable code further comprises instructions for recording the conversation at a request of each client device such that two recordings of the conversation and two transcribed electronic text files of the conversation are stored in the database.

19. The computer readable medium of claim 18, wherein said computer executable code further comprises instructions for comparing the two transcribed electronic text files of the conversation by an annotation differential tool of the server to determine inconsistencies between the two transcribed text files.

20. The computer readable medium of claim 15, wherein said computer executable code further comprises instructions for:
- determining whether all the terms for the electronic trade ticket are extracted from the electronic text file by the ticket generator; and
- transmitting an alert message to a client device associated with at least one of the first and second users of any missing terms by the server processor.

* * * * *